INVENTOR
GEORGE C. KENT
by: Wolfe, Hubbard,
Voit & Osann
ATTYS.

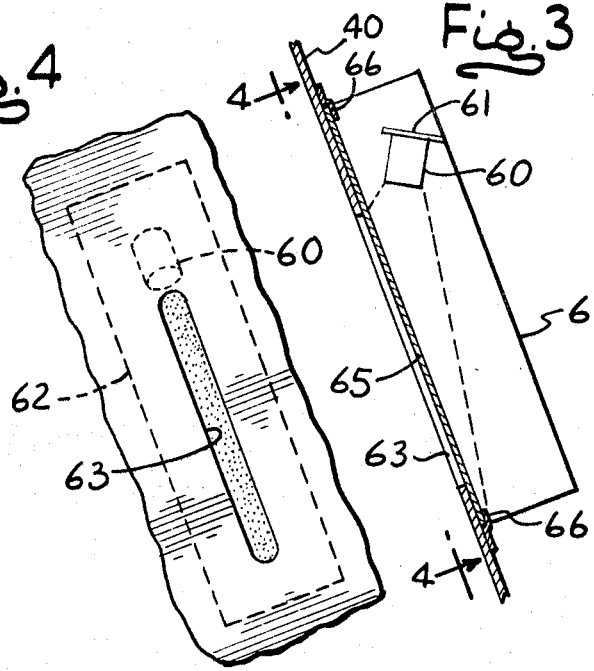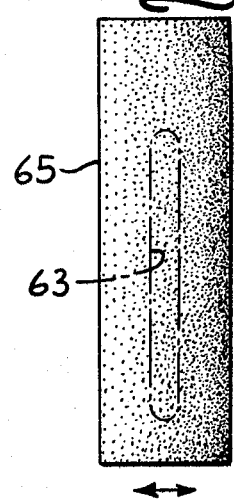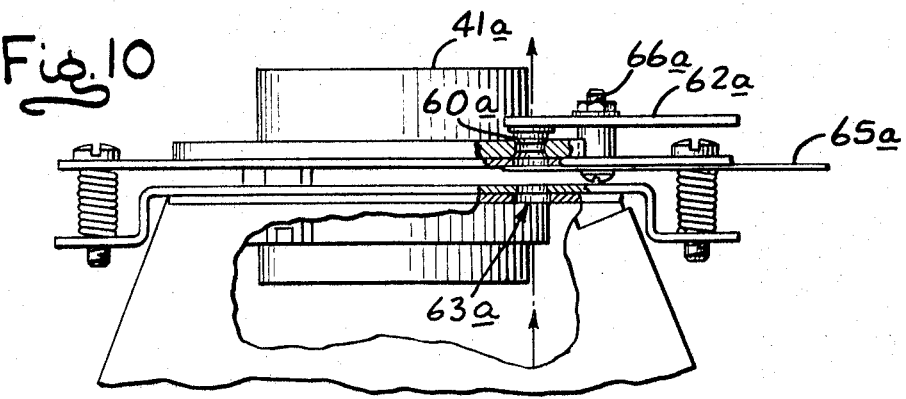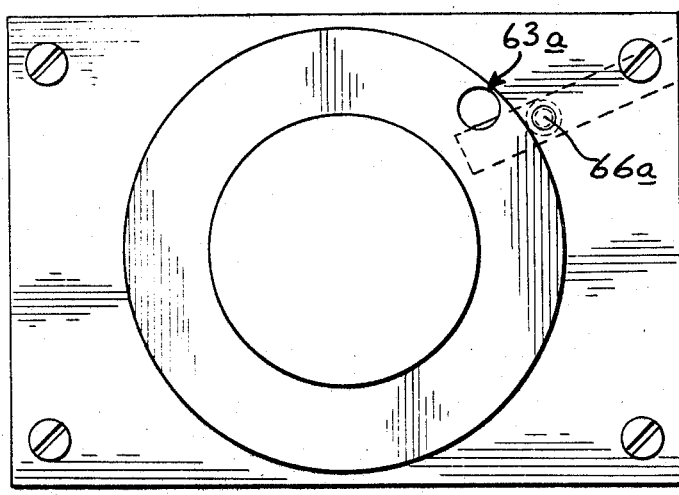

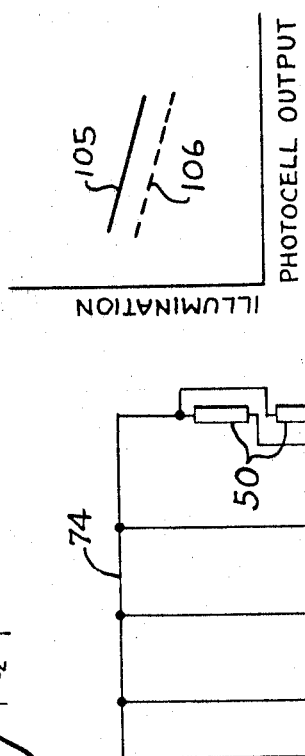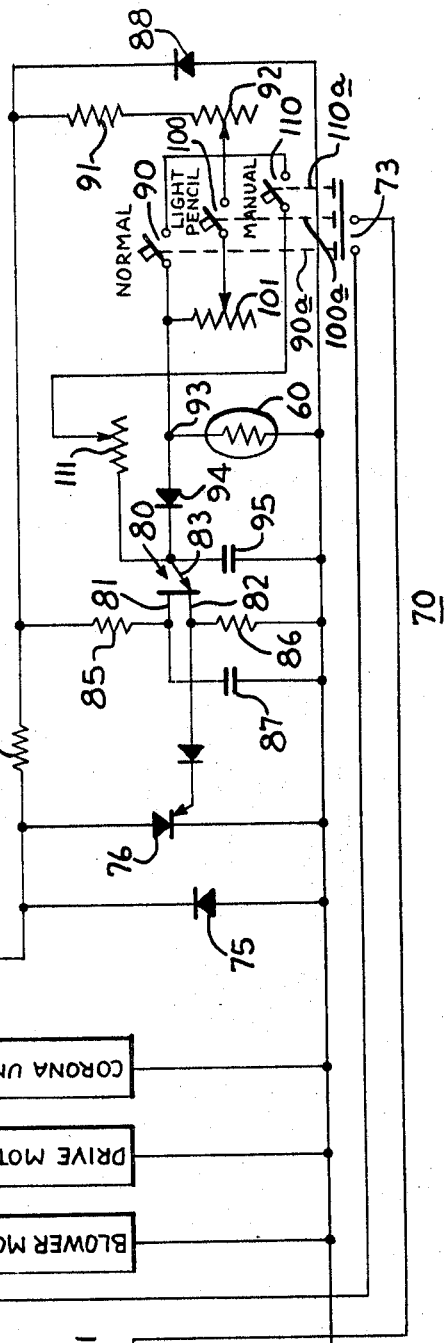

United States Patent Office 3,423,153
Patented Jan. 21, 1969

3,423,153
**CONTROL OF LIGHT LEVEL IN
PHOTOCOPY MACHINE**
George C. Kent, Highland Park, Ill., assignor to American Photocopy Equipment Company, Evanston, Ill., a corporation of Illinois
Filed Jan. 14, 1966, Ser. No. 520,604
U.S. Cl. 355—51                                      10 Claims
Int. Cl. G03b 27/78

ABSTRACT OF THE DISCLOSURE

An arrangement for controlling the light level in a photocopy machine of the type in which the image of a portion of a moving original document is projected onto a corresponding portion of a moving copy sheet in which light reflected from the portion is collected and transmitted to a photocell, with the output signal from the photocell serving to correctively and concurrently vary the illumination of the portion of the original document so that the amount of light applied to successive portions of the copy sheet remains relatively constant.

---

Photocopy machines, and particularly those of the electrostatic type, are often provided with manual controls for controlling the degree of exposure, depending upon whether the original document is darker or lighter than average. Since the adjustment requires that the operator exercise judgment, it is possible for an inexperienced operator to waste a considerable number of copy sheets during the course of a day's work, the problem being compounded when a particular machine is used by an entire office staff. It is particularly difficult to judge exposure when handling originals having different background colors or originals carrying pictorial illustrations or having areas of radically different density.

It is, accordingly, an object of the present invention to provide a photocopy machine having a novel exposure controlling arrangement for automatically adjusting the exposure in accordance with the color or reflection characteristics of the original document. It is a more specific object to provide an exposure control arrangement capable of producing copies having a white background from original documents in which the background is gray or pigmented. It is another object of the invention to provide a photocopy machine intended for office usage which is capable of accepting a wide range of original documents, including documents having wide variations in the density of the printed matter, while producing copies of uniform high quality automatically and without constant adjustment or exercise of judgment on the part of the operator using the machine. Thus it is an object to provide a photocopy machine which is more truly automatic and which reduces wastage of copy sheets to the absolute minimum.

It is a specific object of the present invention to provide, in a photocopy machine of the type employing a progressively scanned original, means for constantly responding to the reflection characteristics of the scanned portion for the making of an automatic corrective adjustment in the level of illumination, i.e., in the level of the light reaching the corresponding portion of the copy sheet.

It is an object of the invention in one of its aspects to provide an improved pick-up arrangement for responding to the integrated value of the light reflected from successive portions of the original for making a constant corrective change in the illumination as the original passes through the machine and which, in addition to correcting for changes in the original, acts automatically to correct for other factors affecting the illumination, notably the line voltage and condition of the illuminating lamp or lamps. It is still another object of the present invention to provide a light pick-up arrangement including novel means for effecting a factory adjustment which is non-critical in its setting and well suited to the manufacture and adjustment of machines on a high production basis.

It is yet another object of the invention to provide a photocopy machine having means for effecting automatic adjustment of the exposure but having alternate control means for taking over control under unusual circumstances, for example, in the copying of hard-pencil originals or originals in which there is a wide range of density between adjacent areas arranged side by side perpendicular to the direction of the scanning movement.

Finally it is an object to provide a photocopy machine which is highly automatic in operation and in control of the exposure but which is nevertheless extremely simple employing solid state circuitry capable of operating almost indefinitely without substantial change in the circuit characteristics so that no especial care or maintenance is required.

Other objects and advantages of the invention will become apparent upon reading the attached detailed description and upon reference to the drawings in which:

FIG. 3 is an enlarged fragmentary view of the photocell sensing arrangement employed in the machine of FIG. 1.

FIG. 4 is a fragmentary view looking along line 4—4 in FIG. 3.

FIG. 5 is a diagram of an optical wedge used in the preferred form of the invention.

FIG. 6 is a schematic diagram of a control circuit with portions simplified to facilitate understanding.

FIG. 6a shows a typical wave of current through the lamps 17.

FIGS. 7 and 8 are diagrammatic plots showing variation of illumination and exposure.

FIGS. 9 and 10 are fragmentary front and top views of an alternate photocell arrangement.

While the invention has been described in connection with a preferred embodiment, it will be understood that I do not intend to be limited to the particular embodiment but intend to cover the various alternative and equivalent control arrangements included within the spirit and scope of the appended claims.

Figure 1:
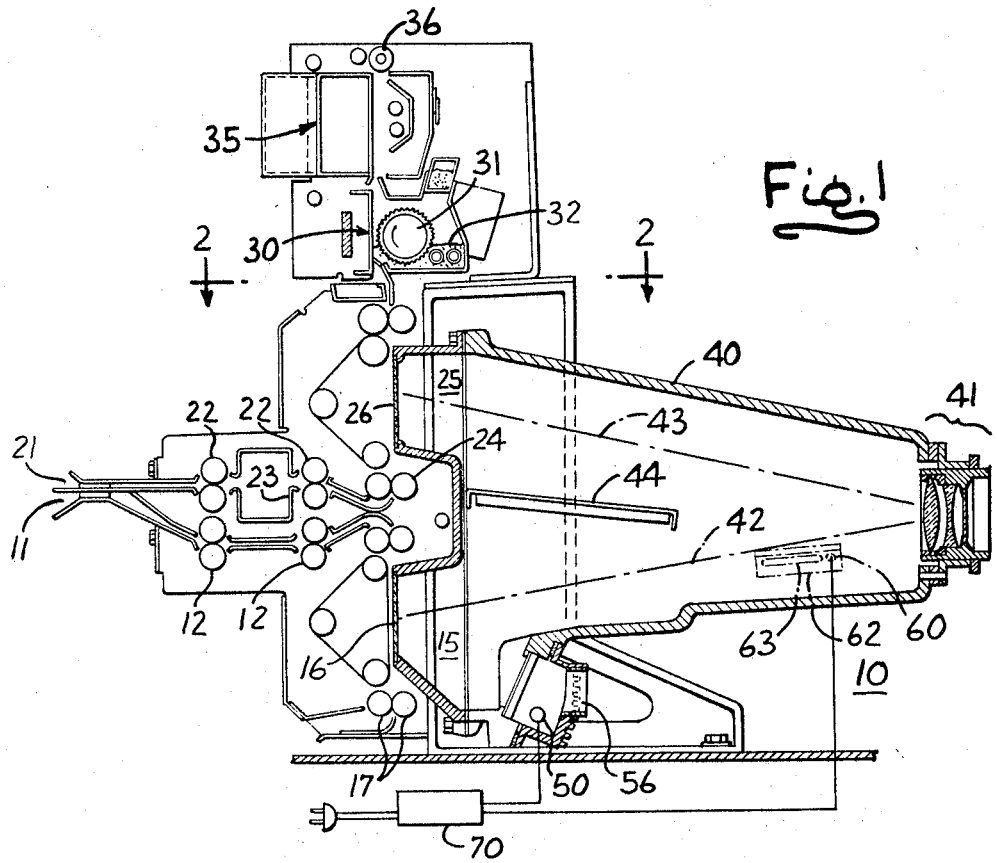
FIGURE 1 is a vertical section taken longitudinally through a photocopy machine utilizing the present invention.

Turning now to FIGURE 1 there is shown a photocopy machine 10 in vertical section with its outer housing removed. The original document is fed, face up, into a slot 11 at the front of the machine, passing, via a set of driven rollers 12, to an illuminating station 15 having a window 16 defining a narrow exposure band which extends transversely with respect to sheet movement. From the exposing station the sheet passes into a pair of expeller rollers 17 for discharge.

The copy sheet is fed into an upper slot 21, simultaneously with the original, being transported by rollers 22 into the corona unit 23 in which the sheet receives electrostatic charge. The copy sheet is preferably of the type described in Patent 3,051,569 which issued on August 28, 1962, having a photosensitive layer formed of finely divided zinc oxide in a suitable dielectric binder. The charged sheet is then transported via rollers 24 into an exposing station 25 having a window 26 which corresponds in shape to the window 16 previously mentioned. Here the image of the moving original is cast upon the copy sheet by optical means to be described, the sheet then passing inwardly into a developing unit 30 where pigmented toner adheres to the image areas. While the developing unit may take various forms, the unit shown includes a magnetic cylinder 31 rotating in contact with a body of toner mix 32 formed of toner in combination with magnetic carrier particles. The developed sheet, with the toner held by electrostatic attraction is next passed into a fixing unit 35 where the sheet is subjected to radiant heat to fuse the toner in place, followed by discharge from expeller rollers 36.

For the purpose of casting the image of the moving original upon the moving copy sheet traveling at the same rate of speed, an optical housing 40 is provided having a mirror and lens unit 41 defining an optical path made up of a first leg 42 and a second leg 43. A light shield 44 extending transversely within the housing 40 is positioned between the two legs of the optical path, helping to insure that the only light which reaches the copy sheet is that which is intentionally reflected from the original document and transmitted through the lens and mirror.

For illuminating the original a pair of tubular incandescent lamps 50, spaced end to end and backed up by a reflector 56, extend parallel to the window 16 to one side of the optical path.

In operation it will be understood that the original document and charged copy sheet, fed into the machine face to face, are diverted in opposite directions into the illuminating station 15 and exposing station 25. With the sheets moving at equal speed in opposite directions, the original is, in effect, scanned over a narrow band extending transversely with respect to the direction of movement, the scanned image being projected via the mirror unit for exposure of the copy sheet which is developed and fixed prior to discharge. To understand the driving arrangement and the other details of the machine, reference may be made to Patent 3,088,386 which issued on May 7, 1963.

In accordance with the present invention a photocell is provided adjacent the optical path and positioned to receive light reflected from the original document in the exposing station together with a control circuit coupled to the lamp for correctively and concurrently varying the light output so that each successive longitudinal portion of the copy sheet is subject to substantially the same amount of exposure over a wide range of reflection characteristics of the original document. More specifically, in accordance with the invention, a translucent panel is interposed between the photocell and the exposing station for integrating the light received from the entire width of the original document and reducing its intensity.

Figure 2:
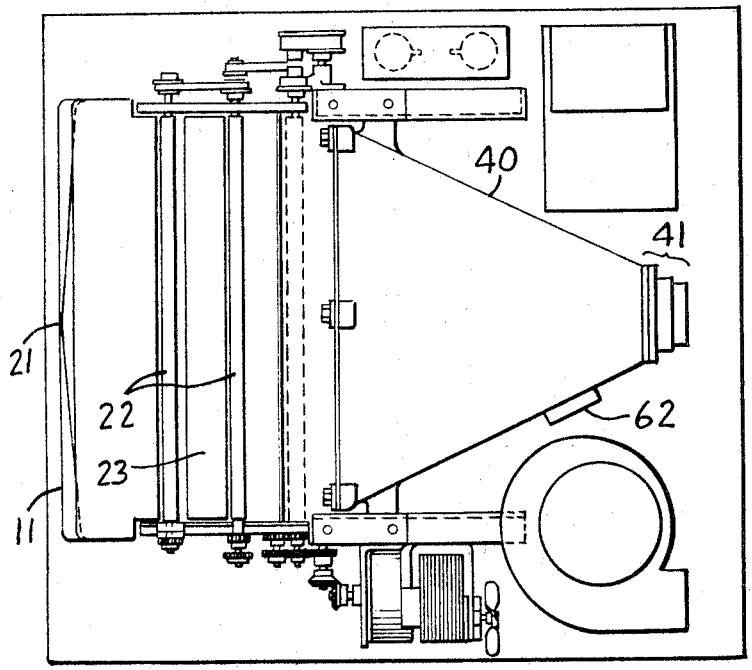
FIG. 2 is a top view of the machine with the upper structure removed and looking along the line 2—2 in FIG. 1.

Thus referring to FIGS. 2–4, I provide in the side wall of the optical housing 40, adjacent the leg 42 of the optical path, a photocell 60 mounted on a bracket 61 in a photocell housing 62. For the purpose of admitting light to the photocell, an opening in the form of an elongated slot 63 is provided having the entire width of the original document within its field of view. For integrating and attenuating the light which is fed to the photocell, a translucent panel 65, or filter, is interposed in front of the photocell. The slot 63 and the surrounding portion of the housing wall thus serves as a mask which limits and defines the illuminated area of the panel.

Preferably, the panel 65 is in the form of an optical wedge, i.e., a neutral filter having a density, or transmission factor, which varies across the width thereof. In FIG. 5 which shows the panel in profile, the transmission factor varies as indicated by the density of the stippling. The panel is mounted in suitable guides or supports 66 so that it may be shifted laterally in one direction or the other for factory adjustment of photocell output under standard conditions. In a practical case using lamps having a total wattage of 850 watts and a window area of 25 square inches, the slot 63 may have an area of 0.7 square inch and the translucent panel may have a transmission factor adjustable upwardly and downwardly from a mean value on the order of 50%. The photocell 60, which may, for example, be of type A35 manufactured by General Electric Company, is oriented on its bracket 61 so that it "sees" the entire illuminated area defined by the slot 63. The photocell should preferably be fixed in position with respect to the slot, with the panel 65 being independently adjustable.

In carrying out the invention, a control circuit 70 is provided (see FIG. 6) for responding to the output signal from the photocell and for constantly and correctively varying the energization of the lamps 17. Power is supplied from the regular commercial supply via lines 71, 72. In series with the line 71 is a switch 73 which energizes a bus 74.

In series with the lamps 50, is a diode 75 for conducting current in one direction and a silicon controlled rectifier, or "SCR," 76 for controlling the flow of current in the opposite direction. For triggering the SCR 76 a unijunction transistor 80 is provided having base connections 81, 82 and an emitter connection 83. The bases have associated resistors 85, 86, respectively, the resistor 85 being bypassed by capacitor 87. For the purpose of regulating the voltage which is applied to the transistor 80, a Zener diode 88 is used having an associated dropping resistor 89.

For controlling the triggering voltage applied to the emitter 83 of the transistor, a voltage divider network is employed having an upper leg and a lower leg, with provision for switching. With the selector switch 90, referred to as the "normal" switch, assumed to be closed, a fixed resistor 91 and a variable resistor 92 are in the upper leg while the photocell 60, having a varying resistance characteristic, is in the lower leg. The voltage at the junction 93 between the legs is fed to the emitter 83 via a diode 94. A capacitor 95 controls the rate of build-up of the voltage at the emitter and hence the point of time at which triggering of the transistor takes place.

It will be apparent to one skilled in the art that for low values of incident light the resistance of the photocell will be high so that the transistor will trigger the SCR 76 rather early in the cycle. Thus, referring to FIG. 6a, which shows a typical voltage wave through the lamps 50, the lower half of 75a of the current wave is that which is passed through the diode 75. The upper half wave of current 76a is that which is passed through the SCR 76. With the current in the upper half of the cycle initiated after a short time $t_1$, it will be apparent that a relatively large R.M.S. current will flow through the lamp. The circuit is adjusted so that the illumination under such conditions is sufficient to produce a white background in the copy sheet. However, when an original document is fed into the machine having a higher reflectance characteristic, the amount of light striking the photocell tends to increase, thus decreasing the effective resistance of the photocell and reducing the level of the voltage applied to the emitter circuit. As a result, it will take additional time for the emitter voltage to build up to the firing point, and the firing of the SCR is accordingly delayed an additional time as indicated at $t_2$ in FIG. 6a. The effect of this time delay is to reduce current fed to the lamps, thereby reducing the amount of light which is cast upon the copy sheet.

It will therefore be seen that the control circuits acts correctively, increasing the illumination, and hence the exposure for original documents having a poor reflection characteristic, i.e. documents having a gray or colored background, while reducing the illumination for original documents having a highly reflective background, so that the exposure is automatically adjusted from one document to the next without any particular care or attention on the part of the operator.

Moreover, it is one of the important features of the present invention that such corrective variation not only takes place between documents but takes place for each successive longitudinal portion of a document and copy sheet. Thus, as the document is fed through the exposing station, any longitudinal variations in the reflectivity are sensed by the photocell which produces a continuously varying output signal for constant corrective variation of exposure.

In accordance with one of the aspects of the present invention means are provided for shifting the control point of the circuit, i.e., the level of illumination corresponding to a given amount of light excitation for the photocell, in a direction to reduce the exposure under automatic control when desired to copy original documents having "thin" copy, for example, a light line produced by a pencil. To do this, referring to FIG. 6, I provide a selector switch 100 having in series therewith an auxiliary variable resistor 101 which is effectively placed in series with the resistors 91, 92 in the upper leg of the photocell network. The resulting increase in resistance of the upper leg of the network reduces the level of voltage applied to the emitter 83 of the unijunction transistor so that a longer time is required for the voltage to build up across capacitor 95 to the firing value, thereby reducing the R.M.S. current in the upper half of the current wave. This reduces the illumination corresponding to a given amount of incident light upon the photocell, reducing the average exposure of the copy sheet. With the copy sheet thus "underexposed," the light lines of a hard pencil or the like are preserved rather than being washed out as part of the background.

The above two modes of operation may be further understood by reference to the diagrams in FIGS. 7 and 8. In FIG. 7 which shows illumination as a function of the photocell output signal, the normal characteristic indicated at 103 is of negative slope showing the corrective action of the control circuit. Thus it is apparent that an increase in reflected light signifying an increase in the output signal of the photocell is accompanied by a decrease in the level of illumination. In the alternate "underexpose" mode of operation, the curve is shifted downwardly as indicated at 104 indicating a reduction in the illumination for each valve of output signal.

In FIGURE 8 the illumination and exposure are both set forth as a function of the nature of the background of the original, from light to dark. The gradations may be in the successive steps of the "gray scale" or, in the case of a colored original, in steps of increasingly darker pigmentation having a reflectivity factor which corresponds to the steps of the "gray scale." Referring first to the "normal" characteristics 105, the slope is positive showing that for light originals the illumination is reduced by the control circuit and for dark originals the illumination is increased to compensate for the fall-off in reflectivity. The result is to produce an exposure, at the copy sheet, which is relatively constant for all originals as shown by the characteristic 106. In the alternate mode of operation the curve of illumination is shifted downwardly as indicated at 107 to produce reduced exposure as indicated at 108.

It will be apparent that operation of the selector switch 100 in lieu of the normal selector switch 90 serves to shift the control point of the circuit to lower the level of illumination corresponding to a given photocell output signal. Stated in other words, the control circuit in its alternate mode acts to reduce the exposure of the copy sheet for a given amount of light reflected from original to copy sheet to insure the copying of "thin" copy on the original document. While it is convenient to bring about the "underexposure" mode by switching in the control circuit, it will be apparent to one skilled in the art that the invention is not limited thereto but includes equivalent manually operated means for reducing the amount of light energy reaching the copy sheet, for example, the interposition of a neutral filter in the optical path ahead of the copy sheet while permitting normal corrective functioning of the photocell and control circuit.

Further in accordance with the present invention, a third selector switch and associated resistor are provided in the circuit for manual control in lieu of the photocell as required to achieve special effects. Thus, the selector switch 110 is in series with a variable, manually controlled resistor 111 which leads directly to the junction feeding the emitter of the transistor. Because of the blocking effect of the diode 94, no voltage is, under such conditions, applied to the photocell so that it is effectively isolated. Under manual control the exposure may be established at any desired level, by varying resistor 111, and not subject to automatic variation. Such operation may, for example, be desired where the document includes a large black area alongside "thin" copy on a white background, the two areas being alined at right angles to the direction of movement of the document. With automatic control, the poorer reflecting characteristic of the "black" area would cause the photocell to call for an increase in illumination. However, such increase would "wash out" the thin copy adjacent the black area. Consequently, under such conditions, the illumination can be decreased by setting the manually controlled resistor 111 at a higher resistance level, reducing the voltage applied to the emitter and thereby delaying the firing of the SCR 76 and resulting in a lower R.M.S. value of current being supplied to the lamps 17. With the illumination thus lowered, the thin copy is preserved.

It is one of the more detailed features of the present invention that the selector switches and main power switch are coupled together so that power is turned on when the mode of operation is selected. Accordingly, each of the three mode selector switches, the "normal" switch 90, the "light pencil" switch 100 and the "manual" switch 110 are connected as, for example, by mechanical connections 90a, 100a, and 110a to the main switch 73 such that when any one of the mode switches is pressed, the contacts of the main switch 73 are closed. In a typical machine, this will include the turning on of the blower motor, drive motor and corona unit as well as the illuminating lamps.

It will be apparent to one skilled in the art that the photocopy machine described above, with its improved control circuitry, not only enables a high degree of automaticity in providing constant modulated exposure for each longitudinal portion of the scanned original, but it provides also for operation in alternate modes to take care of the two exceptional conditions likely to be encountered in office practice, namely, light pencilling or other light copy, and originals having unbalanced areas of extreme density range within the same scanned portion of the sheet.

Employing solid state components, the circuit is effective to provide constant variation over a long period without maintenance, a period which may, in fact, equal or exceed the normal life of the machine. Consequently, the improved operation has not been brought about at the cost of additional servicing or adjustment.

While direct control of current through the lamps is preferred, it will be apparent that the essential thing is the control of the illumination and not of the filaments, so that the control circuit may be employed if desired, and without departing from the invention, for varying the illumination in a way other than that specifically described, for example, by utilizing the output of the control circuit to variably interpose a mask in the light path.

While the invention has been described in connection with scanning by movement of the original document, it will be understood that the invention is applicable to scanning by movement of the optics where the photocell is subject to reflection only of the area being scanned.

In the following claims, the term "window" will be understood to mean an opening, whether or not covered by glass or the like. The term "neutral filter" shall be understood to mean any filter which cuts down the light intensity to the working range of the photocell. The term "field of view" refers to the fact that the translucent panel and the photocell behind it "see" the entire width of the original in the illuminating station.

While the invention has been described in connection with the photocell and neutral filter located at one side of the optical housing, it will be understood that the invention is not necessarily limited thereto and if desired the photocell may be incorporated in the mirror and lens unit 41 as shown in FIGS. 9 and 10. In these views corresponding numerals with addition of subscript 'a have been employed to indicate corresponding parts. Here the mounting or barrel portion of the lens and mirror unit 41a has an aperture 63a admitting light to a photocell 60a. The photocell is mounted on a circuit board 62a. The aperture 63a, which is sufficiently wide in its lateral dimension as to enable the photocell to "see" the entire width of the illuminating station, has a movable shutter 65a in the form of a blade having a central pivot 66a. By adjusting the shutter 65a to cut off a portion of the light reaching a photocell, the control point of the circuit may be shifted, thus accomplishing the same result as the lateral shifting of the neutral filter 65 in the preceding embodiment.

I claim as my invention:

1. In a photocopy machine the combination comprising an illuminating station having a window and an illuminating lamp, means for transporting an original document through said illuminating station, an exposing station having a window, means for transporting a charged photosensitive copy sheet through said exposing station at the same speed as the original, the windows in the stations each being in the form of a narrow band extending transversely to the direction of movement, means including a mirror defining an optical path for optically coupling the windows at the two stations so that the image of the moving original document is cast upon the moving copy sheet, a translucent panel positioned to one side of the optical path for picking up a portion of the integrated light reflected from the illuminated portion of the original document simultaneously with the passage of said document portion through the illuminating station window, a photocell behind said panel and responsive to the light transmitted therethrough for producing a continuous output signal which varies according to the reflection characteristic of the document, and means including a control circuit responsive to the output signal from the photocell and controllingly coupled to the lamp for concurrently and correctively varying the light output thereof so that each successive longitudinal portion of the copy sheet is subjected to substantially the same amount of exposure over a wide range of reflection characteristics of the original document.

2. The combination as claimed in claim 1 in which the translucent panel is in the form of an optical wedge having a mask for subjecting only a selected portion of the panel to incident light together with means for positionally adjusting the panel relative to the mask for pre-setting the proportion of the incident light which reaches the photocell.

3. In a photocopy machine the combination comprising an illuminating station having a source of illumination, means for transporting an original document through said illuminating station, an exposing station, means for transporting a charged white photosensitive copy sheet through said exposing station at the same speed as the original document, the stations each having a window in the form of a narrow band extending transversely to the direction of movement, means defining an optical path for optically coupling the two stations so that the image of the moving original document is cast upon the moving copy sheet, means including a photocell faced to receive light from the illuminating station window for producing a continuous output signal in accordance with the amount of light being reflected from each portion of the original simultaneously with its passage through the illuminating station, and means including a control circuit responsive to the output signal from the photocell and coupled to the source of illumination for concurrently and correctively varying the source of illumination so that each successive longitudinal portion of the copy sheet is subjected to substantially the same total amount of light sufficient to produce a substantially white background substantially independent of the color of the original.

4. The combination as claimed in claim 3 in which a neutral density filter is interposed between the photocell and the illuminating station and in which the photocell receives light exclusively from the illuminated portion of the filter.

5. In a photocopy machine the combination comprising an illuminating station having means for illuminating an original document, an exposing station having a photosensitive copy sheet, optical means for scanning a narrow band on the original document and for projecting the image thereof scanningly onto the copy sheet, means including photocell having a neutral density filter positioned to receive light from the scanned band on the document for transmitting the integral value of said light to the photocell so that a continuous output signal is produced in accordance with the instantaneous amount of light being reflected from such band, and means including a control circuit responsive to the output signal from the photocell and coupled to the illuminating means for concurrently and correctively varying the illumination so that each successive longitudinal portion of the copy sheet is subject to substantially the same total amount of light.

6. The combination as claimed in claim 5 in which manually selectable means are provided for reducing the exposure at the copy sheet for a given amount of light reflected from the original to improve the copying of thin copy on the original document.

7. The combination as claimed in claim 5 in which said control circuit includes manually selectable means for reducing the amount of light emitted by the lamp for a given output of the photocell to insure the copying of thin copy on the original document.

8. The combination as claimed in claim 5 in which the manually selectable means includes a first switch coupled to the photocell for normal operation thereof, means including a second switch coupled to the photocell for modifying the output signal thereof, and means including a third switch having an associated variable resistor interposed in the circuit in lieu of the photocell for manual control of light output.

9. The combination as set forth in claim 5 in which the photocopy machine has a main switch for connecting the same to a supply line, in which the manually selectable means includes a plurality of selector switches, and in which each of the selector switches is coupled to the main switch for turning on the latter when any one of the selector switches is actuated.

10. In a photocopy machine the combination comprising an illuminating station having a window and an illuminating lamp, means for transporting an original document through said illuminating station, an exposing station having a window, means for transporting a charged photosensitive copy sheet through said exposing station at the same speed as the original, the windows in the stations each being in the form of a narrow band extending transversely to the direction of movement, means including a mirror defining an optical path for optically coupling the windows at the two stations so that the image of the moving original document is cast upon the moving copy sheet, a photocell positioned to receive a portion of the light reflected from the original in the direction of the mirror for producing a continuous output signal which varies in accordance with the light being reflected from the illuminated portion of the original simultaneously with its passage through said illuminating station, and means including a control circuit responsive to the output signal from the photocell and controllingly coupled to the lamp for correctively and concurrently varying the light output thereof so that each successive longitudinal portion of the copy sheet is subjected to substantially the same amount of exposure over a wide range of background reflection characteristics of the original document, the photocell being located near the mirror and adjustable means being provided in the front of the photocell to vary the amount of light reaching the photocell.

References Cited

UNITED STATES PATENTS 3,207,050 9/1965 Limberger ........... 88—24 X
3,279,312 10/1966 Rogers ............... 88—24

NORTON ANSHER, *Primary Examiner.*
RICHARD A. WINTERCORN, *Assistant Examiner.*

U.S. Cl. X.R.

355—68